United States Patent Office 2,725,187
Patented Nov. 29, 1955

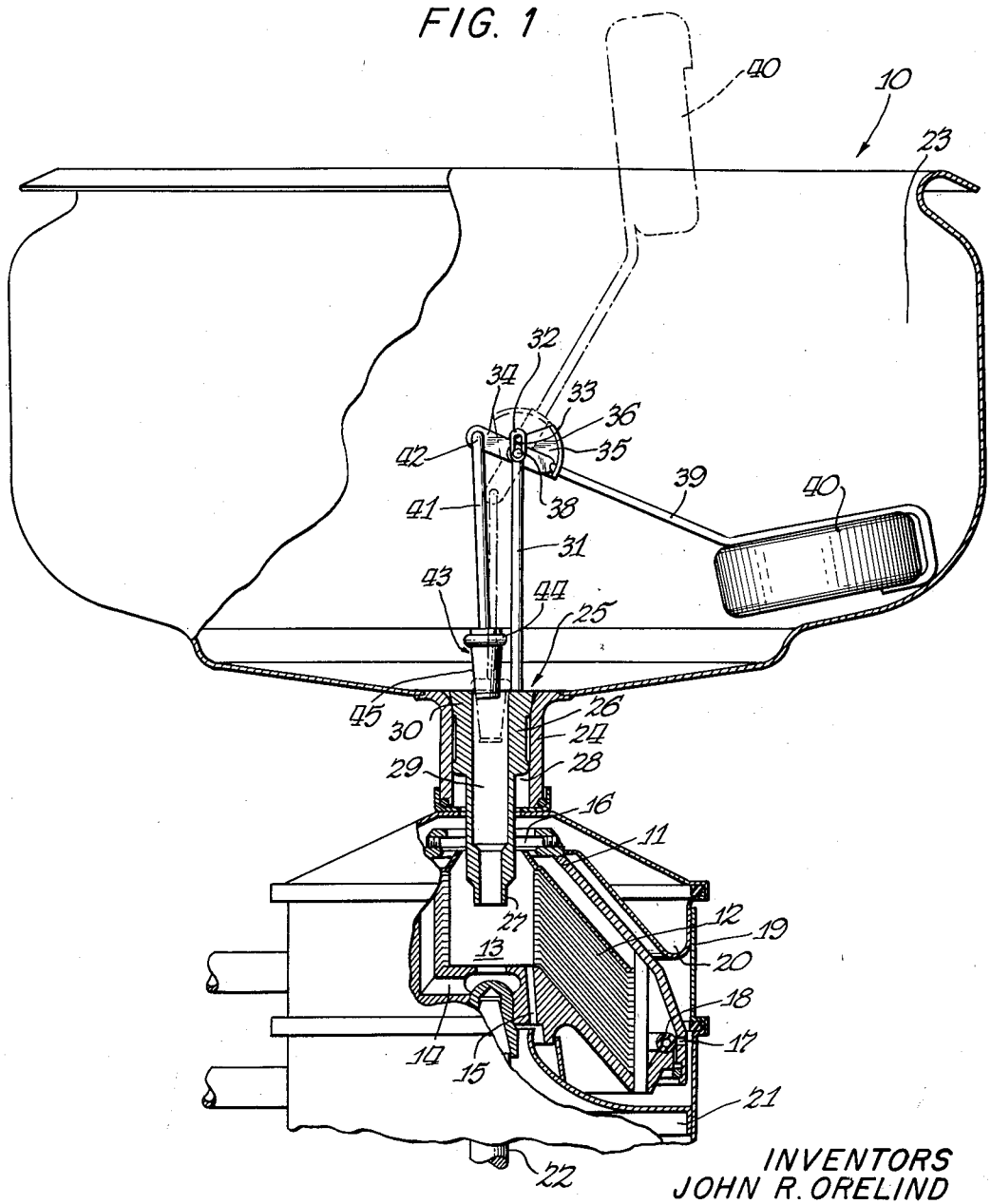

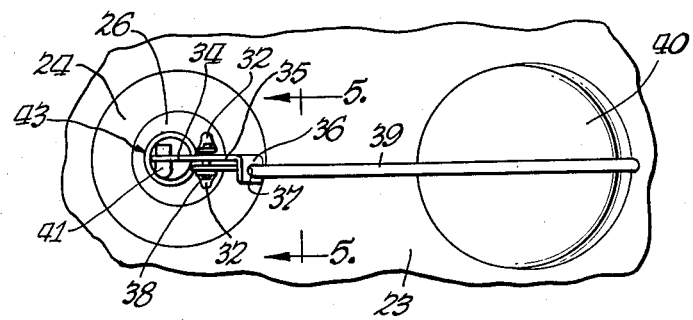
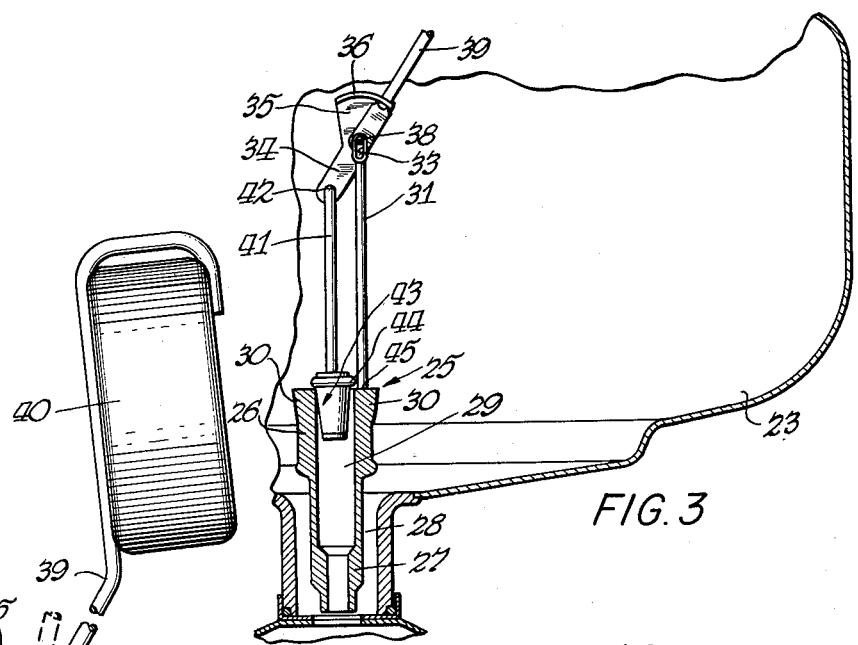
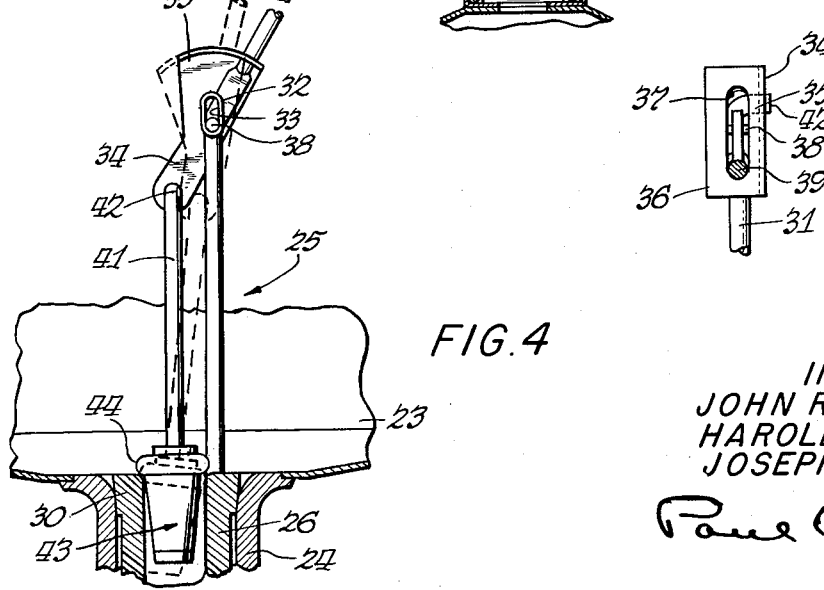

2,725,187

POWER WASHING CREAM SEPARATOR METERING VALVE

John R. Orelind, Wilmette, and Harold W. Hein and Joseph Paplaski, Chicago, Ill., assignors to International Harvester Company, a corporation of New Jersey Application September 21, 1953, Serial No. 381,376

15 Claims. (Cl. 233—19)

This invention relates to power washing cream separators. More specifically this invention relates to an improvement in a metering valve assembly used in connection with power washing cream separators.

In the patent to W. H. Harstick 2,504,261, patented April 18, 1950, a power washing cream separator is disclosed. In a separator of this type the separating bowl is provided with a peripheral discharge opening which, during the washing operation, is adapted to discharge washing liquid for flushing the interior parts of the bowl. In order to direct a constant quantity of whole milk to the bowl during the separating operation a metering valve is provided. This metering valve also includes provisions, such as a milk feed passage and a washing liquid passage, which may be opened by an operator to direct quantities of washing liquid to the bowl during a washing operation. It is a prime object of this invention to provide an improved metering valve assembly for a power washing cream separator.

Still another object is to provide an improved metering valve assembly for power washing cream separators, the metering valve being arranged to direct metered quantities of whole milk through a milk feed tube during the lowering of the liquid level within the supply can, the metering valve also including provisions for opening up a washing liquid discharge passage adapted to direct washing liquid to a separating bowl during a power washing operation.

A still further object of the invention is to provide an improved metering valve assembly comprising a milk feed tube adapted to direct measured quantities of whole milk to a cream separator bowl, the valve assembly including a linkage mechanism connected to a float, the float being adapted to move the linkage mechanism and a metering valve in metering relation with respect to the opening of a milk feed tube.

A more specific object of the invention is to provide a metering valve assembly for centrifugal separators the assembly comprising an axially displaceable milk feed tube which is supported within the discharge tube of a supply can, the milk feed tube including a support on which a float arm is pivotally mounted, the float arm including a float and having a vertically movable link connected to the float arm, the link comprising a metering member having an annular tapering metering surface adapted to be reciprocated within a milk feed tube adjacent the inlet opening thereof, the metering member being moved relative to said milk feed tube during a lowering in the liquid level of the supply can whereby the flow of liquid from the supply can is controlled through said milk feed tube.

These and further objects will become more readily apparent from a reading of the specification when examined in connection with the accompanying sheets of drawings.

In the drawings:

Figure 1 is a side elevational view of a power washing cream separator including a metering valve assembly, the view having portions broken away to illustrate portions of the invention;

Figure 2 is a fragmentary plan view of a metering valve assembly;

Figure 3 is a fragmentary side elevational view, with certain portions in section, of a cream separator supply can and a metering valve assembly therefor;

Figure 4 is a side elevational view of a metering valve assembly disclosing certain positions in the operation; and Figure 5 is a fragmentary sectional view taken along the line 5—5 of Figure 2.

In the drawings a power washing cream separator is generally designated by the reference character 10. The power washing cream separator is more fully described in the above mentioned patent and generally consists of a separating bowl 11 containing a conventional disc pack 12. The disc pack 12 is provided with a centrally disposed receiving space 13 having at its lower end a distributor 14. A downwardly extending cream outlet is designated at 15 and a skim milk outlet is designated 16. The separating bowl 11 is provided with a plurality of washing liquid discharge outlets 17, only one of said outlets being shown. A ring valve 18 is adapted to contract and expand relative to the discharge outlet 17 for regulating the discharge washing liquid from the separating bowl 11.

A tinware construction enclosing the separating bowl is generally designated at 19. The tinware construction 19 comprises a skim milk receiving chamber 20 and a cream receiving chamber 21. A drive spindle 22 is connected to the separating bowl 11, the spindle 22 being suitably connected to a source of power for rotating the separating bowl 11 in a conventional manner. A supply can 23 is positioned on the top of the tinware construction 19, the supply can 23 also including a discharge tube or outlet 24.

A metering valve assembly is generally designated by the reference character 25. The valve assembly comprises a milk feed tube 26 which is disposed within and supported on the discharge tube 24. The milk feed tube 26 includes a projecting portion 27, this portion being of lesser cross-sectional dimension than the discharge tube 24 so that when the milk feed tube 26 is raised with respect to the discharge tube 24 a washing liquid discharge passage 28 and a milk feed passage 29 are provided within the discharge tube 24. The milk feed tube 26 is provided at its upper end with an annular sealing enlargement or shoulder 30 which is adapted to close the upper end of the discharge tube 24 as indicated in the dotted line position in Figure 4.

A support 31 is connected at its lower end to the milk feed tube 26 and extends within the supply can 23. The support 31 is laterally spaced with respect to the axis of the milk feed tube 26. The support 31 includes at its upper end a pair of laterally spaced ear portions 32, each ear portion 32, including a slot 33, the said slots 33 being in lateral alignment. A pivot member or arm 34 is pivoted at the top of the support 31. The pivot member 34 includes at one end, a segmental portion 35, having a laterally extending arcuate flange 36. The flange 36 as best shown in Figure 5 includes a slot 37. A pivot pin or hinge element 38 as best shown in Figure 2 extends laterally through the slots 33 of the ear portions 32. The pivot pin 38 supports for pivotal movement the pivot member 34 and a float arm 39. The float arm 39 by virtue of its loose or limited movement afforded by the pivot pin in slots 33, may move vertically to a limited extent.

The float arm 39 has a float 40 connected thereto. The float arm 39, as indicated in Figure 5 extends through the slot 37 and by virtue of said slot has limited movement with respect to the segmental portion 35. An upwardly extending link 41 is pivotally connected to the pivot member 34 as indicated at 42. A metering member 43 is connected to the lower end of the link 41. The metering member 43 comprises an annular enlarged sealing member 44 and an annular tapered metering surface 45. The metering member 43 may be of resilient construction, or the desired function may be obtained by any plastic or metal member shaped in the manner indicated. The metering surface 45 as indicated is tapered, or it may be stated that longitudinally adjacent portions of the said annular surface have a lesser cross-sectional diameter than the diameter of the milk feed passage so that upon relative movement of the metering surface 45 with respect to said passage, the flow of liquid through the passage 29 can be controlled.

During the separating operation the position of the milk feed tube 26 is as indicated in Figure 1. The supply can 23 is filled with whole milk and the float 40 is in the substantially upright position indicated in the broken lines of Figure 1. The metering member 43 is so disposed relative to the passage 29 that a sufficient opening between the metering member 43 and the milk feed tube 26 permits a predetermined quantity of whole milk to enter into the passage 29 and to the separating bowl 11. As the liquid level within the supply can 23 decreases the head pressure of course also goes down and accordingly it is desired to move the metering member 43 upwardly so that a greater opening takes place between the metering surface 45 and the milk feed tube 26 thereby providing for the same constant flow of whole milk to the separating bowl. Thus as the liquid level descends, the float arm 39 is effective to raise the link 41 and the metering member 43, and by virtue of the tapered metering surface 45, the opening between the metering member 43 and the feed tube 26 is increased progressively. As the head pressure goes down a constant quantity of liquid flows into the separating bowl.

The float arm during the lowering of the liquid level of course engages the lower end of the slot 37 of segmental portion 35 thereby lifting upwardly on the link 41. When it is desired to seal the passage 29 the operator simply moves the float arm 39 in a counterclockwise direction whereby it engages the upper end of the slot 37 and moves the pivot member 34 so that the link 41 is forced downwardly as indicated in the dotted position of Figure 4 and the enlarged sealing portion 44 engages the feed tube 26 in sealing relation. Thus the milk feed passage 29 is suitably closed.

In the washing operation it is desired to open the discharge tube 24 to permit washing liquid to enter into the space 13. Likewise it is desired to open the passage 29 to permit a limited quantity of washing liquid to descend therethrough. In the operation the float is as indicated in the dotted line position of Figure 1 and in the full line position of Figure 4. The operator then merely grasps the float 40 and lifts upwardly whereupon the milk feed tube 26 is displaced axially with respect to the discharge tube 24. The passage 28 is now open and washing liquid descends from the can 23 to the space 13. By virtue of the lost motion of the pin 38 within slots 33, upward pull on the float 40 also causes the link 41 to move upwardly a limited degree so that the sealing surface 45 is partially displaced with respect to the feed tube 26 and permits a limited amount of washing liquid to descend through the passage 29. This washing position is best shown in Figure 3.

Thus it can be seen that an improved metering valve arrangement and power washing separator has been disclosed. The objects of the invention have been fully achieved and it must be understood that changes and modifications may be made in the invention without departing from the spirit of the invention or the scope of the appended claims.

What is claimed is:

1. In a power washing cream separator including a supply can, and a discharge tube connected to said can for discharging whole milk and washing liquid therefrom; a metering valve comprising a milk feed tube supported within said discharge tube, said milk feed tube having a portion projecting downwardly from the discharge tube, the portion having a less cross-sectional diameter than the discharge tube to provide therewith a milk feed passage and a washing liquid passage, a shoulder on said milk feed tube engaging said discharge tube for closing said washing liquid passage during the separating operation, a support on said milk feed tube, said support being laterally spaced with respect to the axis of the feed tube and extending upwardly within said supply can, a pivot arm, a hinge element pivotally connecting said pivot arm intermediate its ends to said support, a normally upright link pivotally connected to one end of said pivot arm, a frustoconical metering member connected to said link, said metering member including a sealing portion adapted to engage said feed tube for closing the same, the metering member including a metering surface tapering to a cross-sectional diameter substantially less than the cross-sectional diameter of said feed tube, a float arm pivotally connected to said pivot arm, and means on said pivot arm to provide for limited movement of said float arm relative to said pivot arm, said float arm being movable from a substantially upright position during a high liquid level within said can wherein said metering member is in telescoping engagement with said feed tube and said metering surface is in substantially sealing engagement with said feed tube, to provide for pivotal movement of said pivot arm during a lowering of the liquid level within the can wherein said metering member is progressively withdrawn axially from said feed tube thereby moving the metering surface with respect to said feed tube and thereby controlling the flow of milk through said milk feed passage.

2. In a power washing cream separator including a supply can, and a discharge tube connected to said can for discharging whole milk and washing liquid therefrom; a metering valve comprising a milk feed tube supported within said discharge tube, said milk feed tube having a portion projecting downwardly from the discharge tube, the portion having a less cross-sectional diameter than the discharge tube to provide therewith a milk feed passage and a washing liquid passage, a shoulder on said milk feed tube engaging said discharge tube for closing said washing liquid passage during the separating operation, a support on said milk feed tube, said support being laterally spaced with respect to the axis of the feed tube and extending upwardly within said supply can, a pivot arm, a hinge element pivotally connecting said pivot arm intermediate its ends to said support, a normally upright link pivotally connected to one end of said pivot arm, a frusto-conical metering member connected to said link, said metering member including a sealing portion adapted to engage said feed tube for closing the same, the metering member including a metering surface tapering to a cross-sectional diameter substantially less than the cross-sectional diameter of said feed tube, a float arm pivotally connected to said arm, and means on said pivot arm to provide for limited movement of said float arm relative to said pivot arm, said float arm being movable from a substantially upright position during a high liquid level within said can, to provide for pivotal movement of said pivot arm during a lowering of the liquid level within the can wherein said metering member is progressively withdrawn axially from said feed tube moving the metering surface with respect to said feed tube and thereby controlling the flow of milk through said milk feed passage, said float arm being movable to an upright position thereby moving said link and metering member axially whereupon said sealing portion closes said milk feed passage and said metering valve may be axially moved with respect to said discharge tube whereby liquid from said can may be discharged therethrough.

3. In a power washing cream separator including a supply can, and a discharge tube connected to said can for discharging whole milk and washing liquid therefrom; a metering valve comprising a milk feed tube supported within said discharge tube, said milk feed tube having a portion projecting downwardly from the discharge tube, the portion having a less cross-sectional diameter than the discharge tube to provide therewith a milk feed passage and a washing liquid passage, a shoulder on said milk feed tube engaging said discharge tube for closing said washing liquid passage during the separating operation, a support on said milk feed tube, said support being laterally spaced with respect to the axis of the feed tube and extending upwardly within said supply can, a pivot arm, a hinge element pivotally connecting said pivot arm intermediate its ends to said support, a normally upright link pivotally connected to one end of said pivot arm, a frustoconical metering member connected to said link, said metering member including a sealing portion adapted to engage said feed tube for closing the same, the metering member including a metering surface tapering to a cross-sectional diameter substantially less than the cross-sectional diameter of said feed tube, a float arm pivotally connected to said pivot arm, means on said pivot arm to provide for limited movement of said float arm relative to said pivot arm, said float arm being movable from a substantially upright position during a high liquid level within said can wherein said metering member is in telescoping engagement with said feed tube, to provide for pivotal movement of said pivot arm during a lowering of the liquid level within the can wherein said metering member is progressively withdrawn axially from said feed tube thereby moving the metering surface with respect to said feed tube and thereby controlling the flow of milk through said milk feed passage, said float arm being movable to an upright position thereby moving said link and metering member axially whereupon said sealing portion closes said milk feed passage, said metering valve being movable axially with respect to said discharge tube to open said washing liquid passage, and a lost motion connection between said pivot member and said support whereby said sealing portion is moved relative to said feed tube during an upward pull on said float arm and liquid may be discharged through said milk feed passage.

4. In a power washing cream separator including a supply can, and a discharge tube connected to said can for discharging whole milk and washing liquid therefrom; a metering valve comprising a milk feed tube supported within said discharge tube, said milk feed tube having a portion projecting downwardly from the discharge tube, the projecting portion having a less cross-sectional diameter than the discharge tube to provide therewith a milk feed passage and a washing liquid passage, closure means on said milk feed tube engaging said discharge tube for closing said washing liquid passage during the separating operation, a support on said milk feed tube, said support extending upwardly within said supply can, a pivot arm, a hinge element pivotally connecting said pivot arm intermediate its ends to said support, a normally upright link pivotally connected to one end of said pivot arm, a frustoconical metering member connected to said link, said metering member including a sealing portion adapted to engage said feed tube for closing the same, the metering member including a metering surface tapering to a cross-sectional diameter substantially less than the cross-sectional diameter of said feed tube, a float arm pivotally connected to said support, a float connected to said float arm, and means on said pivot arm to provide for limited movement of said float arm relative to said pivot arm, said float arm being movable from a substantially upright position during a high liquid level within said can wherein said metering member is in telescoping engagement with said feed tube, to provide for pivotal movement of said pivot arm during a lowering of the liquid level within the can wherein said metering member is progressively withdrawn axially from said feed tube thereby moving the metering surface with respect to said feed tube and thereby controlling the flow of milk through said milk feed passage.

5. In a power washing cream separator including a supply can, and a discharge tube connected to said can for discharging whole milk and washing liquid therefrom; a metering valve comprising a milk feed tube supported within said discharge tube, said milk feed tube having a portion projecting downwardly from the discharge tube, the projecting portion having a less cross-sectional diameter than the discharge tube to provide therewith a milk feed passage and a washing liquid passage, means on said milk feed tube engaging said discharge tube for closing said washing liquid passage during the separating operation, a support on said milk feed tube, a pivot arm, a hinge element pivotally connecting said pivot arm to said support, a normally upright link pivotally connected to one end of said pivot arm, a metering member connected to said link, said metering member including a sealing portion adapted to engage said feed tube for closing the same, the metering member including a metering surface tapering to a cross-sectional diameter substantially less than the cross-sectional diameter of said feed tube, a float arm pivotally connected to said support, a float connected to said float arm, and means on said pivot arm to provide for limited movement of said float arm relative to said pivot arm, said float arm being movable from a substantially upright position during a high liquid level within said can wherein said metering member is in telescoping engagement with said feed tube to provide for pivotal movement of said pivot arm during a lowering of the liquid level within the can wherein said metering member is progressively moved axially with respect to said feed tube thereby moving the metering surface with respect to said feed tube and thereby controlling the flow of milk through said milk feed passage.

6. In a power washing cream separator including a supply can, and a discharge tube connected to said can for discharging whole milk and washing liquid therefrom; a metering valve comprising a milk feed tube supported within said discharge tube, said milk feed tube having a portion projecting downwardly from the discharge tube, the projecting portion having a less cross-sectional diameter than the discharge tube to provide therewith a milk feed passage and a washing liquid passage, means on said milk feed tube engaging said discharge tube for closing said washing liquid passage during the separating operation, a support on said milk feed tube, a pivot arm pivotally connected to said support, a normally upright link pivotally connected to one end of said pivot arm, a metering member connected to said link, said metering member including a sealing portion adapted to engage said feed tube for closing the same, the metering member including a metering surface tapering to a cross-sectional diameter substantially less than the cross-sectional diameter of said feed tube, a float arm pivotally connected to said support, and a float connected to said float arm, said float arm being movable from a substantially upright position during a high liquid level within said can wherein said metering member is in telescoping engagement with said feed tube to provide for pivotal movement of said pivot arm during a lowering of the liquid level within the can wherein said metering member is moved axially with respect to said feed tube thereby moving the metering surface with respect to said feed tube and thereby controlling the flow of milk through said milk feed passage.

7. In a power washing cream separator including a supply can, and a discharge tube connected to said can for discharging whole milk and washing liquid therefrom; a metering valve comprising a milk feed tube supported within said discharge tube to provide therewith a milk feed passage and a washing liquid passage, means on said milk feed tube engaging said discharge tube for closing said washing liquid passage during the separating operation, a support on said milk feed tube, a pivot arm pivotally connected to said support, a normally upright link pivotally connected to one end of said pivot arm, a metering member connected to said link, the metering member including a metering surface, a float arm pivotally connected to said support, a float connected to said float arm, and means connecting said float arm to said pivot arm, said float arm being movable from a substantially upright position during a high liquid level within said can wherein said metering member is in telescoping engagement with said feed tube to provide for pivotal movement of said pivot arm during a lowering of the liquid level within the can wherein said metering member is progressively moved axially with respect to said feed tube thereby moving the metering surface with respect to said feed tube and thereby controlling the flow of milk through said milk feed passage.

8. In a power washing cream separator comprising a supply can and a discharge tube for discharging liquid from said can; a metering valve comprising a milk feed tube disposed within said discharge tube to provide a washing liquid discharge passage and a milk feed passage, closure means on said feed tube adapted to seal said discharge tube, an upright support on said feed tube, a pivot arm pivoted on said support, a link pivotally connected to said pivot arm, a float connected to said pivot arm, a metering member connected to said link, said metering member including an annular tapering surface, and an enlarged sealing portion on said member, said pivot arm being movable for moving said link and the metering member axially from sealing engagement with respect to said milk feed passage during a lowering of the liquid level within said can whereby said metering surface is moved relative to said feed passage and the flow of liquid is controlled therethrough.

9. In a power washing cream separator comprising a supply can and a discharge tube for discharging liquid from said can; a metering valve comprising a milk feed tube disposed within said discharge tube to provide a washing liquid discharge passage and a milk feed passage, closure means on said feed tube adapted to seal said discharge tube, an upright support on said feed tube, a pivot arm pivoted on said support, a link pivotally connected to said pivot arm, a float connected to said pivot arm, a metering member connected to said link, said metering member including a tapering surface, and a sealing portion on said member, said pivot arm being movable for moving said link and the metering member axially from sealing engagement with respect to said milk feed passage during a lowering of the liquid level within said can whereby said metering surface is moved relative to said feed passage and the flow of liquid is controlled therethrough.

10. In a power washing cream separator comprising a supply can and a discharge tube for discharging liquid from said can; a metering valve comprising a milk feed tube disposed within said discharge tube to provide a washing liquid discharge passage and a milk feed passage, closure means on said feed tube adapted to seal said discharge tube, an upright support on said feed tube, a pivot arm pivoted on said support, a link pivotally connected to said pivot arm, a float connected to said pivot arm, a metering member connected to said link, said metering member comprising a tapered plug adapted to reciprocate within said milk feed passage, said pivot arm being movable for moving said link and the plug axially with respect to said milk feed passage during a lowering of the liquid level within said can and the flow of liquid is controlled therethrough.

11. In a centrifugal separator having a supply can, and a milk feed tube having an opening for discharging liquid from said can; a metering valve comprising a support adapted to be positioned within the supply can, a pivot arm, means pivotally connecting said pivot arm to said support, a link pivotally connected to said pivot arm, a float arm pivotally connected to said support, a float connected to said float arm, means connecting said float arm to said pivot arm to permit limited relative movement of said arms, and a metering member on said link, said metering member including a tapered metering surface and said member being movable axially relative to the opening of said feed tube, said link being movable in response to movement of said float during a lowering of the liquid level in said can to move said metering surface relative to said feed tube whereby the flow of liquid is controlled therethrough.

12. In a centrifugal separator in accordance with claim 11 including a sealing portion on said metering member adapted to engage said feed tube in sealing relation during an upright position of said float arm.

13. In a centrifugal separator in accordance with claim 12 including a lost motion connection between said link and said support whereby said sealing portion may be displaced from said feed tube during an upward pull on said link.

14. In a power washing cream separator including a supply can, and a discharge tube connected to said can for discharging whole milk and washing liquid therefrom; a metering valve comprising a milk feed tube supported within said discharge tube to provide therewith a milk feed passage and a washing liquid passage, means on said milk feed tube engaging said discharge tube for closing said washing liquid passage during the separating operation, a support on said feed tube, a normally upright link, a metering member connected to said link, the metering member including a metering surface, a float arm pivotally connected to said support, a float connected to said float arm, and means connecting said float arm to said link, said float arm being movable from a substantially upright position during a high liquid level within said can wherein said metering member is in telescoping engagement with said feed tube, to provide for vertical movement of said link during a lowering of the liquid level within the can wherein said metering member is progressively moved relative to said feed tube thereby moving the metering surface with respect to said feed tube and thereby controlling the flow of milk through said milk feed passage.

15. In a power washing cream separator comprising a supply can and a discharge tube for discharging liquid from said can; a metering valve comprising a milk feed tube disposed within said discharge tube to provide a washing liquid discharge passage and a milk feed passage, closure means on said feed tube adapted to seal said discharge tube, a support on said feed tube, a pivot arm pivoted on said support, a link pivotally connected to said pivot arm, a float connected to said pivot arm, a metering member connected to said link, said metering member being adapted to move relative to said milk feed passage, said pivot arm being movable for moving said link and the metering member relative to said milk feed passage during a lowering of the liquid level within said can and the flow of liquid is controlled through said milk feed passage.

References Cited in the file of this patent

UNITED STATES PATENTS

| 357,547 | Beimling | Feb. 8, 1887 |
| 1,429,331 | Feldmeier | Sept. 19, 1922 |
| 2,504,261 | Harstick | Apr. 18, 1950 |

FOREIGN PATENTS

| 674,585 | Germany | Apr. 15, 1939 |